US011295598B2

(12) United States Patent
Hedges et al.

(10) Patent No.: US 11,295,598 B2
(45) Date of Patent: Apr. 5, 2022

(54) VEHICLE-OCCUPANT ALERT SYSTEM

(71) Applicant: Aptiv Technologies Limited, St. Michael (BB)

(72) Inventors: Christopher A. Hedges, Greentown, IN (US); Douglas L. Welk, Rossville, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/137,066

(22) Filed: Dec. 29, 2020

(65) Prior Publication Data
US 2021/0209927 A1 Jul. 8, 2021

Related U.S. Application Data

(60) Provisional application No. 62/957,423, filed on Jan. 6, 2020.

(51) Int. Cl.
*G08B 21/24* (2006.01)
*B60Q 9/00* (2006.01)
(Continued)

(52) U.S. Cl.
CPC .............. *G08B 21/24* (2013.01); *B60Q 9/00* (2013.01); *G06K 9/00369* (2013.01);
(Continued)

(58) Field of Classification Search
CPC .... B60W 10/06; B60W 10/10; B60W 10/184; B60W 2050/0004; B60W 2530/00;
(Continued)

(56) References Cited

U.S. PATENT DOCUMENTS

| 6,104,293 | A | * | 8/2000 | Rossi | ..................... | B60N 2/002 340/425.5 |
| 6,922,147 | B1 | * | 7/2005 | Viksnins | ................ | B60N 2/002 340/573.1 |

(Continued)

OTHER PUBLICATIONS

"Partial European Search Report", EP Application No. 21150034.3, dated May 7, 2021, 20 pages.
(Continued)

*Primary Examiner* — Daniel Previl
(74) *Attorney, Agent, or Firm* — Sawtooth Patent Group PLLC (57) ABSTRACT

The techniques of this disclosure relate to a vehicle-occupancy alert system. The system includes a controller circuit configured to receive occupant data from an occupancy-monitoring sensor configured to detect a presence of one or more objects inside a vehicle. The controller circuit is also configured to determine whether an operator of the vehicle has exited the vehicle based on the occupant data. The controller circuit is also configured to determine based on the occupant data that the one or more objects remain inside the vehicle for a time exceeding a first threshold after the operator has exited. The controller circuit is also configured to output an alert indicating the one or more objects remain inside the vehicle when the time exceeds the first threshold. The system can improve passenger safety by alerting the vehicle operator that a child remains in the vehicle unattended before the operator moves away from the vehicle.

20 Claims, 8 Drawing Sheets

(51) Int. Cl.
*G06K 9/00* (2022.01)
*G08B 21/02* (2006.01)
*G08B 21/04* (2006.01)
*G08B 21/18* (2006.01)
*G08B 21/22* (2006.01)
*G08B 25/00* (2006.01)

(52) U.S. Cl.
CPC ..... *G06K 9/00838* (2013.01); *G08B 21/0277* (2013.01); *G08B 21/0469* (2013.01); *G08B 21/182* (2013.01); *G08B 21/22* (2013.01); *G08B 25/005* (2013.01)

(58) Field of Classification Search
CPC ....... B60W 2556/00; B60W 30/18009; B60W 30/18045; B60W 50/0098; Y02T 10/60; E05B 77/50; E05B 77/54; G06F 21/568; G06F 9/4406; G08B 13/08; Y10T 70/5978
USPC ......... 340/457, 573.1, 425.5, 667, 426, 438, 340/573.4, 425.2, 539.1
See application file for complete search history.

(56) References Cited

U.S. PATENT DOCUMENTS

| | | | | |
|---|---|---|---|---|
| 9,604,571 | B1* | 3/2017 | Kurtovic | ................ G08B 21/24 |
| 2003/0222775 | A1* | 12/2003 | Rackham | ............ G08B 25/016 |
| | | | | 340/457 |
| 2004/0155783 | A1* | 8/2004 | Al-Sheikh | .............. G08B 21/22 |
| | | | | 340/584 |
| 2018/0065504 | A1 | 3/2018 | Lan et al. | |
| 2018/0315292 | A1 | 11/2018 | Pham | |
| 2019/0193590 | A1* | 6/2019 | Labombarda | .......... G08B 21/24 |
| 2019/0251820 | A1 | 8/2019 | Friedman | |

OTHER PUBLICATIONS

"Extended European Search Report", EP Application No. 21150034.3, dated Aug. 10, 2021, 17 pages.

* cited by examiner

VEHICLE-OCCUPANT ALERT SYSTEM

CROSS-REFERENCE TO RELATED APPLICATIONS

This application claims the benefit under 35 U.S.C. 119(e) of U.S. Provisional Application No. 62/957,423, filed Jan. 6, 2020, the disclosure of which is hereby incorporated by reference in its entirety herein.

BACKGROUND

Outside temperatures can create an unsafe environment inside an unattended vehicle, sometimes killing or injuring people and animals (e.g., children and pets) left inside. Many of the injuries and deaths are caused by heat trauma from temperatures in excess of thirty degrees Celsius inside the vehicle when vehicle windows are closed. Injuries or deaths can also be caused by leaving occupants unattended in the vehicle under cold conditions, for example, when outside temperatures are below freezing. Many municipalities try to prevent this issue by enacting laws that make it illegal to leave an unattended child or pet in a vehicle, and some vehicle manufacturers have installed systems that detect a presence of an object in a rear seat and remind a driver to look in the rear seat before exiting the vehicle. Once the driver exits the vehicle, however, the driver is responsible to remember that the occupants or objects remain in the vehicle.

In addition to the tragic situations that may result from leaving a child or pet in an unattended vehicle, certain food or medical items can spoil or freeze if forgotten for long in hot or cold temperatures. For example, when a driver returns from a grocery store and forgets to retrieve a bag of groceries or medicine from the rear seat of the vehicle, its contents may spoil or freeze before the driver remembers and returns to retrieve the bag from the rear seat.

SUMMARY

This document describes one or more aspects of a vehicle-occupant alert system. In one example, the system includes a controller circuit configured to receive occupant data from an occupancy-monitoring sensor configured to detect a presence of one or more objects inside a vehicle. The controller circuit is also configured to determine whether an operator of the vehicle has exited the vehicle based on the occupant data. The controller circuit is also configured to determine, based on the occupant data, that the one or more objects remain inside the vehicle for a time exceeding a first threshold after the operator has exited the vehicle. The controller circuit is also configured to output an alert indicating the one or more objects remain inside the vehicle when the time exceeds the first threshold.

In another example, a method includes receiving, with a controller circuit, occupant data from an occupancy-monitoring sensor configured to detect a presence of one or more objects inside a vehicle. The method also includes determining, with the controller circuit, whether an operator of the vehicle has exited the vehicle based on the occupant data. The method also includes determining, based on the occupant data, with the controller circuit, that the one or more objects remain inside the vehicle for a time exceeding a first threshold after the operator has exited the vehicle. The method also includes outputting an alert, with the controller circuit, indicating the one or more objects remain inside the vehicle when the time exceeds the first threshold.

This summary is provided to introduce aspects of a vehicle-occupant alert system, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where cameras can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a vehicle-occupant alert system are described in this document with reference to the following drawings. The same numbers are used throughout the drawings to reference like features and components.

DETAILED DESCRIPTION

Overview

The techniques of this disclosure relate to a vehicle-occupant alert system. A controller circuit receives data from in-cabin sensors that detect whether a driver has exited a vehicle. When the driver has exited the vehicle, the controller circuit determines whether a person (e.g., a child, an elderly person), a pet, or other live or perishable object remains in the vehicle unattended. The controller circuit starts a timer when the driver exits the vehicle and alerts the driver to the person, pet, or other live or perishable object left behind when the time exceeds a first threshold. If the person, pet, or other live or perishable object left behind is not retrieved after the time exceeds a second threshold, the controller circuit increases an intensity of the alert and sends notifications to the driver and another registered user device via text message, email, or voice message, to draw the driver's attention back to the vehicle. If the time that person, pet, or other live or perishable object remains unattended in the vehicle exceeds a third threshold, the controller circuit increases the intensity of the notifications to the driver and other registered user device. If the notifications go unanswered, and it is a person left behind, the controller circuit sends the notification to emergency medical services (EMS)

to assist the person left unattended in the vehicle. The vehicle-occupant alert system can improve passenger safety when an occupant is left unattended in the vehicle, especially under environmental conditions that may be considered hazardous to a health of the occupant. Even if the driver has exited and is no longer in proximity to the vehicle, the described vehicle-occupant alert system will alert the driver to a living or perishable object that has been inadvertently left behind, before the situation turns tragic.

Example System

Figure 1:
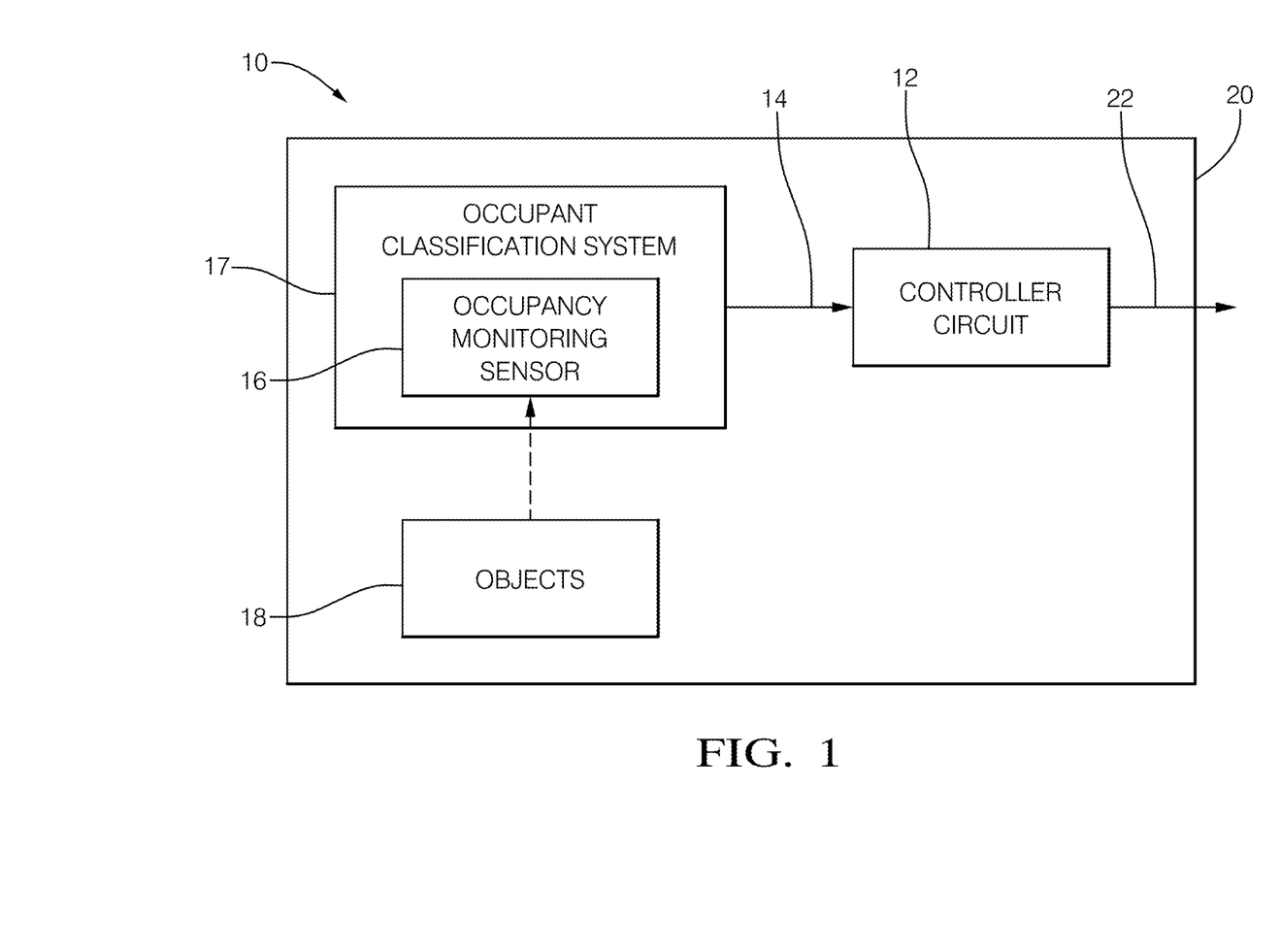
FIG. 1 illustrates an example of a vehicle-occupant alert system.

FIG. 1 illustrates an example of a vehicle-occupant alert system 10, hereafter referred to as the system 10. The system 10 includes a controller circuit 12 configured to receive occupant data 14 from an occupancy-monitoring sensor 16 that detects a presence of one or more objects 18 inside a vehicle 20 and outputs an alert 22 based on the objects 18, as will be described in more detail below. As used herein, the term "inside a vehicle" refers to all compartments of a vehicle, including enclosed compartments of any associated trailers. For example, while the vehicle 20 is towing an enclosed trailer, the occupancy-monitoring sensor 16 can detect a presence of the one or more objects 18 if they are inside the enclosed storage area of the trailer, for example, where livestock, horses, or other animals may be transported. The driver may need to be reminded to keep the vehicle 20 running even if stepping away so a climate control system or ventilation system of the trailer can continue to keep the one or more objects 18 at a safe temperature.

In the example illustrated in FIG. 1, the occupancy-monitoring sensor 16 is a component of an occupant classification system 17 (OCS 17) installed on the vehicle 20, which will be explained in more detail below. In this example, the controller circuit 12 is installed on the vehicle 20 and is communicatively coupled to the occupancy-monitoring sensor 16 via a transmission link. The transmission link can be wired or wireless interfaces, for example, BLUETOOTH®, Wi-Fi®, near field communication (NFC), universal serial bus (USB), universal asynchronous receiver/transmitter (UART), or controller area network (CAN). In some examples, the controller circuit 12 receives data from other vehicle systems via a CAN bus (not shown), for example, temperature external to the vehicle, vehicle cabin interior temperature, a door opening and closing events, a door lock position, an ignition status, a vehicle speed, and a transmission gear selection.

Controller Circuit

The controller circuit 12 may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller circuit 12 may also combine custom hard-wired logic, ASICs, or FPGAs with custom programming to perform the techniques. The controller circuit 12 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 12 may include other examples of non-volatile memory, such as flash memory, read-only memory (ROM), programmable read-only memory (PROM), and erasable programmable read-only memory (EPROM). The controller circuit 12 may include volatile memory (e.g., dynamic random-access memory (DRAM), static random-access memory (SRAM)). The controller circuit 12 can include one or more clocks or timers used to synchronize the control circuitry or determine an elapsed time of events. The one or more routines may be executed by the processor to perform steps for determining the presence of the one or more objects 18 inside a vehicle 20 based on signals received by the controller circuit 12 from the occupancy-monitoring sensor 16 as described herein.

Occupancy-Monitoring Sensor

Figure 2:
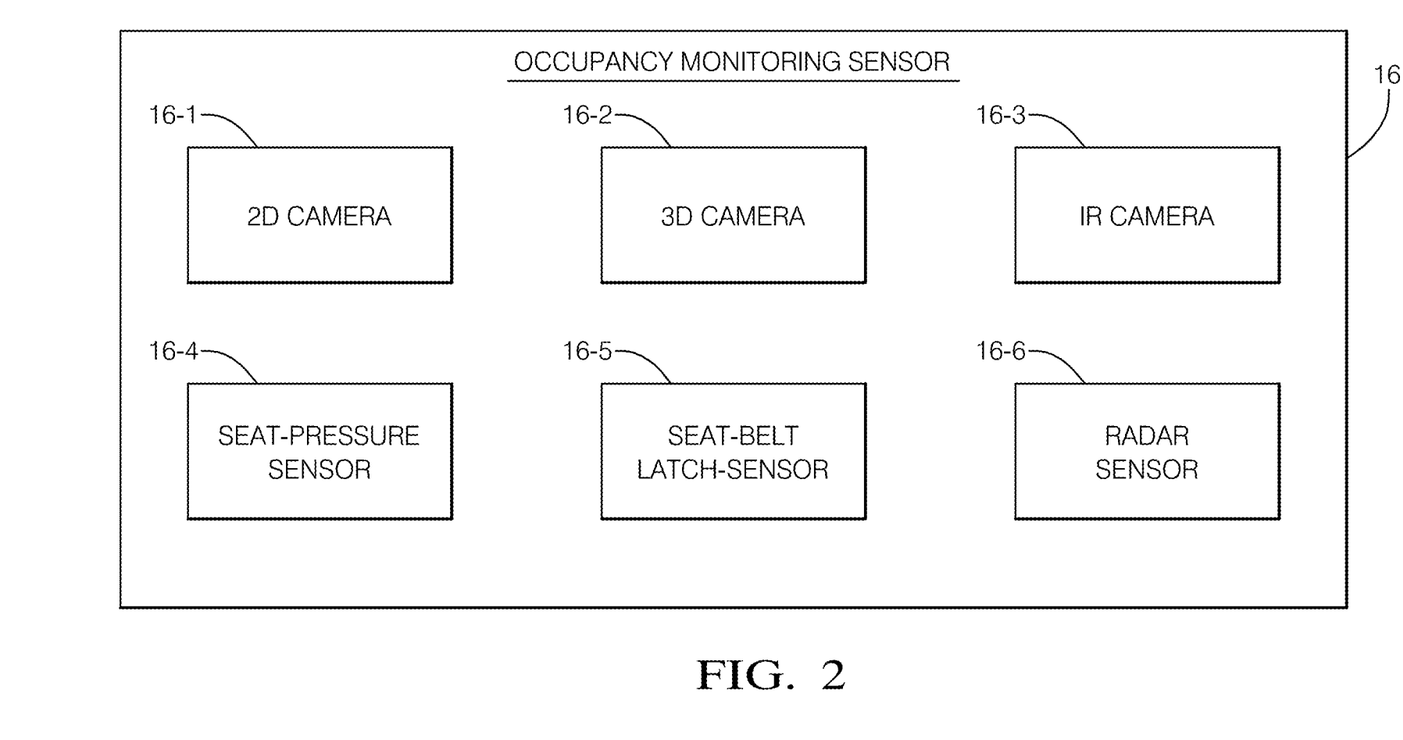
FIG. 2 illustrates an example occupancy-monitoring sensor isolated from the example of the vehicle-occupant alert system of FIG. 1.

FIG. 2 illustrates an example of the occupancy-monitoring sensor 16 that is located remotely from the system 10. The occupancy-monitoring sensor 16 can include one or more sensors that detect an occupancy of a seat in the cabin of the vehicle 20 and can be components of the OCS 17 installed on the vehicle 20.

The occupancy-monitoring sensor 16 can include a camera that captures images of the vehicle cabin, and the OCS 17 determines whether the seat is occupied by a person or an inanimate object based on the images. Software in the OCS 17 can distinguish persons from animals and objects 18 using known image-analysis techniques.

The objects 18 in the images are detected in regions of interest that correspond to the seating positions within the cabin, and the objects 18 are classified by the software into human and other classifications. Processing blocks or models in the software are pre-trained to recognize human forms or shapes of other objects 18, for example, a child safety seat, a shopping bag, a box, or an animal. The camera can be a two-dimensional (2D) camera or a 3D time-of-flight camera that measures a time for light pulses to leave the camera and reflect back on the camera's imaging array. The camera can be a thermal or an infrared (IR) camera and can detect a living being or a temperature of an object based on a thermal image captured by the IR camera.

The occupancy-monitoring sensor 16 can include a seat-pressure sensor that detects a pressure or pressure distribution applied to the seat. The OCS 17 can determine whether an adult or the child is occupying the seat based on a pressure threshold indicative of a weight of the occupant, and by the distribution of the pressure that can indicate whether a child safety seat is installed. For example, if the weight of the occupant is greater than thirty kilograms, the OCS 17 may determine that the passenger is considered an adult. The OCS 17 can deactivate an air bag, for example, when the child safety seat is detected or when the seat is not occupied by a person. The OCS 17 can also reduce an inflation force of the air bag based on a size and weight of the occupant.

The occupancy-monitoring sensor 16 can include a seat-belt-latch sensor that detects whether the seat belt is latched, and the OCS 17 can determine whether the passenger occupying the seat requires a latched seat belt (e.g., when the vehicle 20 is in motion). The seat-belt-latch sensor can be a reed sensor located in a latch housing that is actuated when a tongue of the buckle is inserted into the latch housing. The actuated reed sensor completes an electrical circuit that indicates to the OCS 17 that the buckle is properly latched. The OCS 17 can determine, based on the respective electrical circuit, which seat in the cabin corresponds to the latched or unlatched seat belt.

The occupancy-monitoring sensor 16 can include a radar sensor that detects a presence of objects 18 in the vehicle cabin, and the OCS 17 can determine whether the seat is occupied by the person or the inanimate object based on point cloud data received from the radar sensor. The OCS 17 compares the point cloud data to models in the software to determine whether the seat is occupied by the person or the inanimate object. In some examples, the radar sensor can detect relatively small movements, for example, movements of a chest wall of the passenger that is breathing. The radar sensor can be used to detect the presence of the child that may be seated in the child safety seat and covered where the camera or thermal camera may not detect the child.

The occupancy-monitoring sensor 16 can include an ultrasonic sensor (not shown) that detects the presence of objects in the vehicle cabin using reflected sound waves. In some examples, the OCS 17 determines whether the seat is occupied by the object 18 by comparing a travel time or time between sending and receiving an echo of the sound waves to a baseline travel time for an unoccupied seat. When the seat is occupied, the travel time of the sound wave will be less compared to the travel time for the unoccupied seat. In other examples, the ultrasonic sensor can detect profiles of objects 18, for example, a profile of a person, a child safety seat, or a package, and the OCS 17 can determine whether the seat is occupied based on the detected profile. The OCS 17 can include a library of profiles associated with known objects 18 for comparison to the detected profiles.

The occupant data 14 from the OCS 17 can be periodically updated by the OCS 17 to ensure the controller circuit 12 can accurately determine an occupancy status. For example, the OCS 17 can update the occupant data 14 at thirty-second intervals to account for changes in the seat occupancy due to passengers exiting or entering the vehicle 20.

Occupancy Status

The controller circuit 12 determines the occupancy status of the seats in the cabin of the vehicle 20 based on the occupant data 14 received from the occupancy-monitoring sensor 16. The occupancy status can be indicative of several occupancy-status parameters that include a seat occupancy, a seat-belt engagement, a seat-belt alignment relative to the occupants, a child safety seat alignment relative to the seat, or any combination thereof.

The seat-occupancy parameter indicates whether the seat is occupied or vacant and whether the seat is occupied by an adult, a child, a pet, or a package. The controller circuit 12 can determine the seat occupancy based on the occupant data 14 from one or more of the devices that are included in the occupancy-monitoring sensor 16. For example, the cameras or radar sensors can capture image or cloud point data of the seat locations in the cabin, and the OCS 17 can process the data to determine whether the seats are empty or occupied by a person or an object. In some examples, the OCS 17 uses data from the seat-pressure sensor in addition to the image or cloud point data to support the determination that the seat is occupied.

Figure 3:
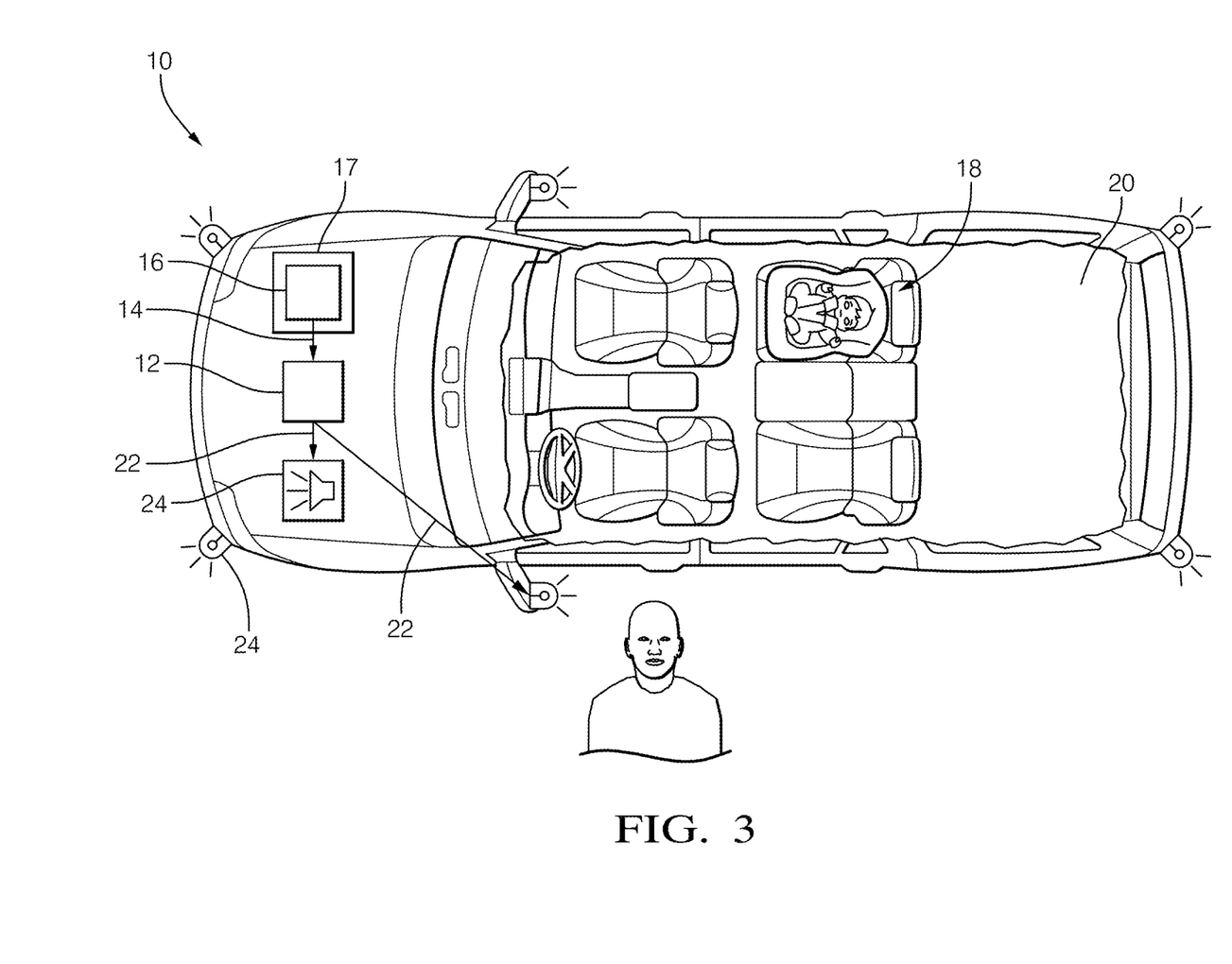
FIG. 3 illustrates an example of the vehicle-occupant alert system of FIG. 1 installed on a vehicle where the driver has exited the vehicle leaving a child in the vehicle.

FIG. 3 illustrates the system 10 installed on the vehicle 20 from which the operator or driver has exited and is standing beside a left side of the vehicle 20. In this example, the object 18 located in a rear seat of the vehicle 20 is the child restrained by the child safety seat. The controller circuit 12 can determine that the driver has exited the vehicle 20 based on the occupant data 14 received from the OCS 17. For example, the controller circuit 12 can determine that the driver's seat is unoccupied based on the in-cabin cameras and the seat-pressure sensor located in the driver's seat, as described above. The controller circuit 12 can also determine that the driver's door has cycled open and closed based on signals received via the CAN bus from other vehicle controllers or door latch actuators installed on the vehicle 20.

In the example illustrated in FIG. 3, after the driver exits the vehicle 20 the controller circuit 12 sends a signal to a sounding device, for example, a vehicle horn or other alert device 24 that is audible to the driver external to the vehicle 20, to immediately remind the driver that the child remains in the vehicle 20. The signal can cause the vehicle horn to chirp or make sounds that are different from other driver reminders, for example, the other driver reminders that may be made when the driver locks the doors, leaves a key fob inside the vehicle 20, or leaves the headlights illuminated. When the controller circuit 12 determines that the driver has exited the vehicle 20, the controller circuit 12 also starts the timer. The controller circuit 12 can use the driver's door opening and closing cycling event as a trigger for starting the timer or can use the cycling event from a last door operated, for example, a passenger door or a rear lift gate. The controller circuit 12 can also use a door-lock actuation as the trigger for starting the timer, for example, when the driver exits the vehicle 20 and locks the doors.

The controller circuit 12 monitors the timer and determines when the child remains inside for a time exceeding a first threshold 26. The first threshold 26 can be predetermined, for example, in a range of thirty to sixty seconds, which may be sufficient time for the driver to exit and walk to an opposite side of the vehicle 20 and open a passenger door to access the child. When the driver waits longer than the first threshold 26 to open the door for the child in the rear seat, it may be possible that the driver has forgotten that the child is in the rear seat, and the driver may leave the vehicle 20 with the child unattended in a potentially unsafe environment. When the controller circuit 12 determines that the child remains inside for the time exceeding the first threshold 26, the controller circuit outputs the alert 22 to the alert device 24, thereby alerting the driver that the child remains inside the vehicle 20.

The controller circuit 12 can receive key fob or mobile transceiver localization data via the CAN bus from a passive-entry passive-start (PEPS) system, a remote-keyless entry (RKE) system, or a Digital Key system that may be installed on the vehicle 20. The localization data can include Received Signal Strength Indicator values (RSSI values) of radio frequency (RF) signals detected by the key fob or mobile transceiver. The RSSI values are a measurement of the power present in the received RF signal. Larger RSSI values indicate stronger received RF signals and are inversely related to a distance between the signal source, for example, between a broadcasting antenna on the vehicle 20 and the key fob. That is, the stronger the detected radio signal, the shorter the distance between the broadcasting antenna and the key fob. The controller circuit 12 can use the RSSI values as the trigger for starting the timer based on the RSSI values. For example, when the driver exits the vehicle 20 to service the vehicle 20 at a filling station, the PEPS or RKE systems determine that the key fob is external to and within a threshold distance (e.g., two meters) from the vehicle 20. The controller circuit 12 can refrain from starting the timer while the key fob is within the two meter distance from the vehicle 20. When the key fob is determined to be farther from the vehicle 20 than the distance threshold the controller circuit 12 can output the alert 22 to the alert device 24, thereby alerting the driver that the child remains inside the vehicle 20.

Alerts

The alert 22 can be audible or visible to the driver from outside the vehicle 20. In the example illustrated in FIG. 3, the alert 22 includes repeatedly sounding the vehicle horn and repeatedly flashing the exterior lights of the vehicle 20 (e.g., headlights, taillights, sidelights, turn signals, and courtesy lights). The audible alert 22 can include sounding the horn at regular intervals, for example, at five-second intervals, to draw the driver's attention back to the vehicle 20 when the driver is moving away from the vehicle 20. The visual alert 22 can include flashing the vehicle's exterior lights at regular intervals, for example, at one-second intervals, to also draw the driver's attention back to the vehicle 20 in the event the driver does not respond to the audible alert 22. The controller circuit 12 continues to output the alert 22 until the driver opens the vehicle door to retrieve the child, thereby canceling the alert, or until the time exceeds a second threshold 28.

The controller circuit 12 can increase an intensity of the output of the alert 22 when the time exceeds the second threshold 28 of, for example, in the range of sixty to ninety seconds. When the driver waits longer than the second threshold 28 to open the door for the child in the rear seat, it may be possible that the driver has moved farther away from the vehicle 20, thereby increasing the possibility that the driver has forgotten that the child in the vehicle 20. The controller circuit 12 can increase an intensity of the output of the audible alert 22 by sounding the horn at, for example, two-second intervals and increasing a volume of the horn soundings. The controller circuit 12 can increase the intensity of the output of the visible alert 22 by flashing the vehicle's 20 exterior lights at, for example, one-half-second intervals, thereby creating a strobe effect that can draw the driver's attention back to the vehicle 20 in the event the driver does not respond to the audible alert 22.

Notifications

Figure 4:
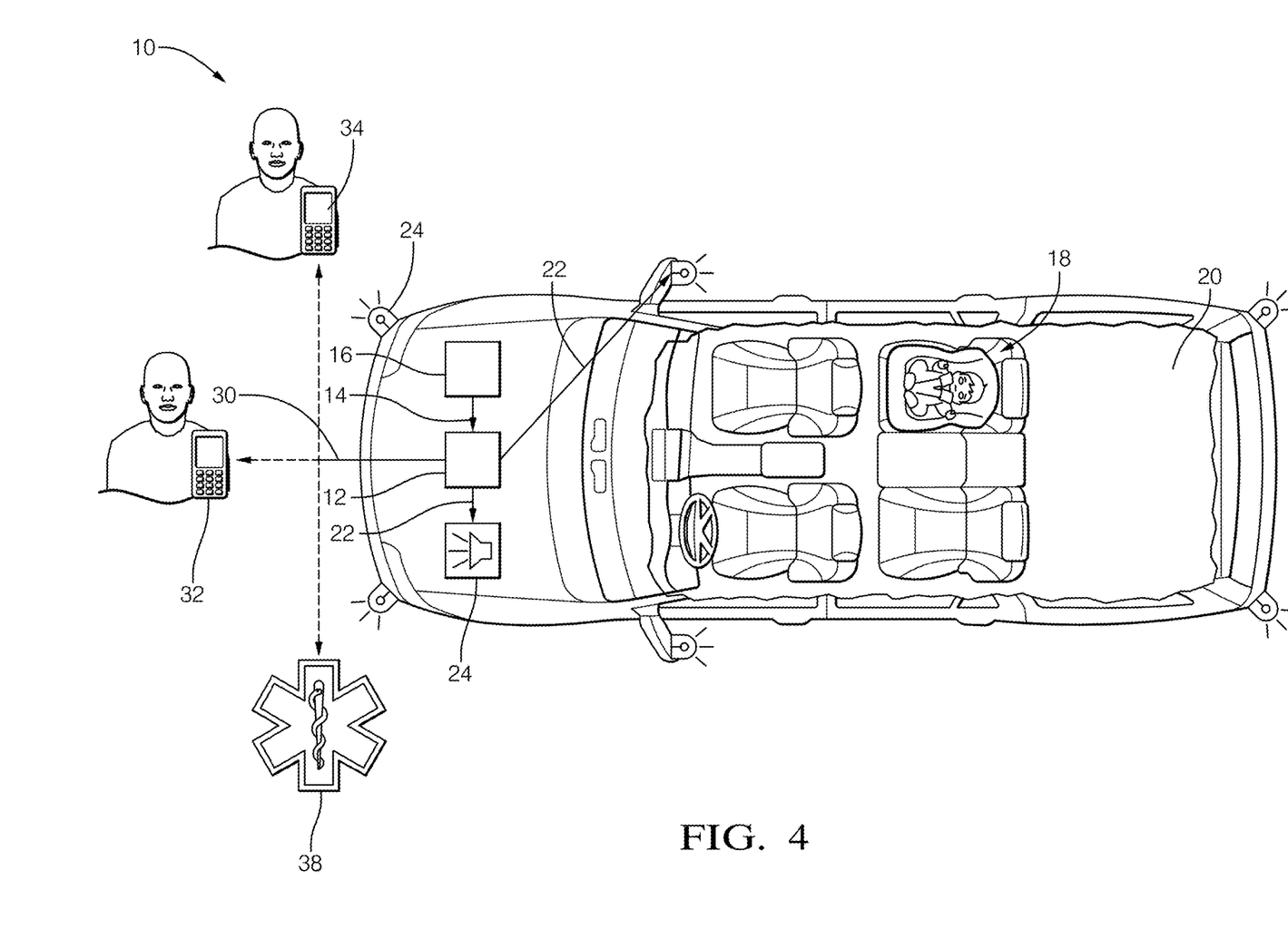
FIG. 4 illustrates another example of the vehicle-occupant alert system of FIG. 1 installed on the vehicle where the driver has exited the vehicle and receives a notification.

FIG. 4 illustrates a scenario where the driver has moved away from the vehicle 20 and may be unable to hear or see the audible or visual alerts 22 that have been increased in their intensity. The controller circuit 12 can output a notification 30 that the child remains inside the vehicle when the time exceeds the second threshold 28. The notification 30 can be output to a registered receiver device via one or more of an email, text message, and voice notification through a transceiver (not shown) that may be a component of the infotainment system of the vehicle 20. The registered receiver device can include a first device 32 associated with the driver, for example, a mobile phone, a satellite phone, or a tablet. The registered receiver device can also include and a second device 34 (e.g., a second mobile phone) different from the first device 32 that is associated with at least one user other than the driver, for example, a caregiver or another family member who may be able to act upon the notification 30. The notification 30 can include a prepared message instructing the driver to return to the vehicle 20, or can provide additional details, for example, stating that the child or other objects 18 determined by the controller circuit 12 remain in the unattended vehicle 20.

The controller circuit 12 can increase the frequency of subsequent outputs of the notification 30 when the time exceeds a third threshold 36, for example, in the range of 120 to 180 seconds. The controller circuit 12 can send subsequent text messages and phone calls to the driver's mobile device at regular intervals (e.g., every sixty seconds) and can send repeated emails to the driver's email address of record until the driver responds to the notification 30 or returns to the vehicle 20 to retrieve the child. The notifications can prompt the driver or other person having the second device 34 to acknowledge the notification by sending a reply via text, email, or voice call.

In the event that the driver or other registered device user does not respond to the repeated notifications, the controller circuit 12 can output the notification 30 to emergency medical services 38 (EMS 38). For example, the controller circuit 12 may notify EMS 38 after three attempts to reach the driver or other person. The controller circuit 12 can send a prepared voice or text message to the EMS 38 by dialing a universal emergency number (e.g., "911" in the United States, "112" in the European Union countries, and "999" in the United Kingdom) stating that the child is left unattended in the vehicle 20 and provide location information that may be available via the CAN bus from a global navigation satellite system (GNSS) that may be a component of the vehicle's 20 navigation or infotainment system. The controller circuit 12 can port the emergency call to the infotainment system installed on the vehicle 20 to enable a voice conversation between an EMS dispatcher and the child that can provide the dispatcher with information related to the child's wellbeing until the EMS vehicle arrives at the vehicle 20.

Table 1 below lists examples of the threshold times and example actions that the controller circuit 12 can initiate after the driver has exited the vehicle 20.

TABLE 1

EXAMPLE THRESHOLD TIMES AND ACTIONS

| THRESHOLD | TIME (SECONDS) | ACTION |
| --- | --- | --- |
| FIRST | 30-60 | ALERT WITH HORN SOUNDINGS OR FLASHING LIGHTS |
| SECOND | 60-90 | INCREASE FREQUENCY OF HORN SOUNDINGS OR FLASHING LIGHTS AND SEND VOICE, TEXT, EMAIL NOTIFICATIONS TO REGISTERED DEVICES |
| THIRD | 120-180 | INCREASE FREQUENCY OF VOICE, TEXT, EMAIL NOTIFICATIONS TO REGISTERED DEVICES AND SEND NOTIFICATIONS TO EMS |

Figure 5:
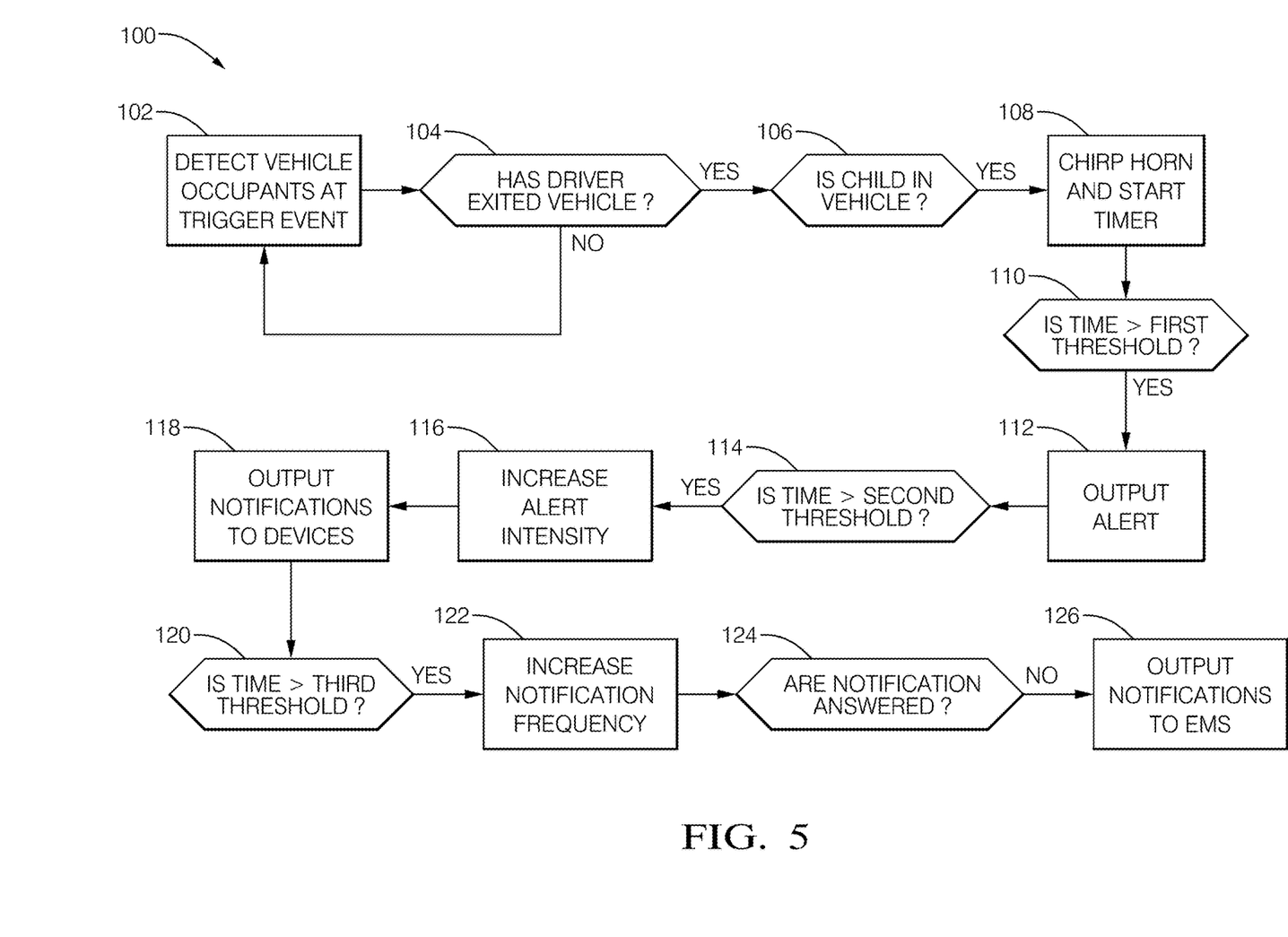
FIG. 5 is an example flow chart of an example logic flow performed by a controller circuit of the system of FIG. 1.

FIG. 5 is a flow diagram illustrating an example logic flow 100 performed by the controller circuit 12. The logic flow starts at 102 with detecting the vehicle occupants upon a triggering event and ends at 126 with notifying the EMS 38.

In this example, at 102, upon the doors or door locks being cycled, the controller circuit 12 determines the occupants remaining in the vehicle 20. At 104, the controller circuit 12 determines whether the driver has exited the vehicle 20 based on the occupant data 14 from the OCS 17. If the driver has not exited the vehicle 20, the system 10 continues to monitor the occupant status. If the driver has exited the vehicle 20, at 106, the controller circuit 12 determines whether the child remains in the vehicle 20.

If the child remains in the vehicle 20, at 108, the controller circuit 12 chirps the horn to remind the driver of the child's presence and starts the timer. At 110, the controller circuit 12 determines whether the elapsed time since the driver exited the vehicle 20 is greater than the first threshold 26, and if so, at 112, outputs the alert 22 to the alert devices. At 114, the controller circuit 12 determines whether the elapsed time since the driver exited the vehicle 20 is greater than the second threshold 28, and if so, and 216, increases the intensity of the alert 22. At 118, the controller circuit 12 outputs the notifications 30 to the first device 32 and second device 34 (e.g., the driver's mobile phone and another family member's mobile phone).

At 120, the controller circuit 12 determines whether the elapsed time since the driver exited the vehicle 20 is greater than the third threshold 36, and if so, at 122 increases the frequency of the notifications 30. At 124, the controller circuit 12 determines whether the notifications are acknowledged, and if not, at 126, outputs the notification 30 to the EMS 38.

Thresholds

The first threshold 26 can be based on an ambient temperature external to the vehicle 20 that can be received by the controller circuit 12 via the CAN bus from the heating-ventilation-and-air-conditioning (HVAC) system of the vehicle 20. The controller circuit 12 can adjust the first threshold 26 to shorter times when the ambient or outside temperature is in a range that is considered harmful to people and animals. For example, when the outside temperature is below freezing or greater than thirty-five Celsius (35° C.), the controller circuit 12 can reduce the first threshold to ten seconds. The shortened first threshold 26 can inhibit the driver from moving farther away from the vehicle 20 when the environmental conditions may be considered hazardous, thereby reducing the need for an escalation in the alerts and notifications.

Figure 6:
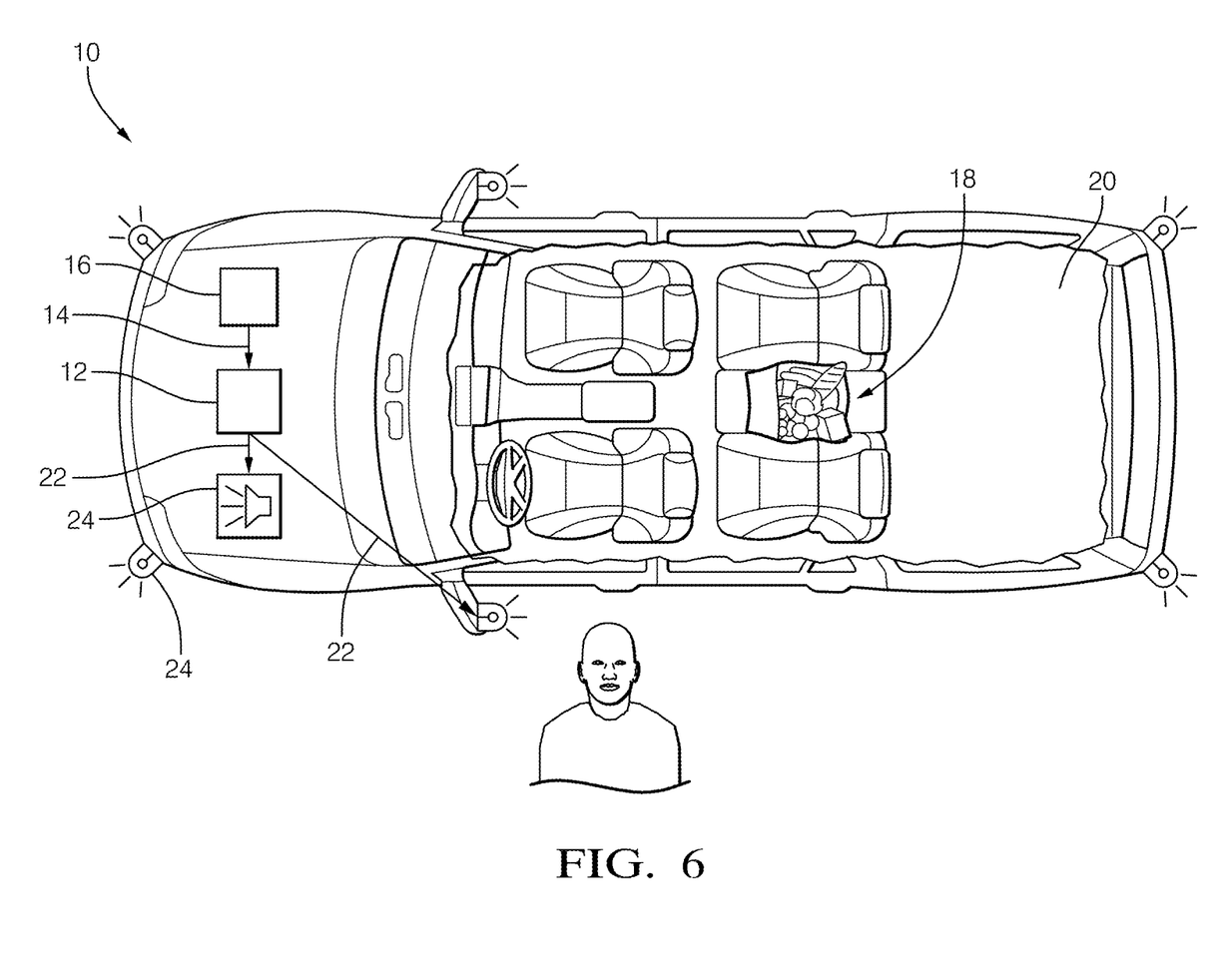
FIG. 6 illustrates another example of the vehicle-occupant alert system of FIG. 1 installed on a vehicle where the driver has exited the vehicle leaving a package in the vehicle.

FIG. 6 illustrates another example of the system 10 installed on the vehicle 20 where the driver has exited the vehicle 20, and a bag of groceries remains on the rear seat. The first threshold 26 can be based on a temperature of the one or more objects 18 remaining inside the vehicle 20 that are detected by the thermal camera of the occupancy-monitoring sensor 16, as described above. For example, the thermal camera can detect the temperature of an item in the grocery bag, and the controller circuit can determine whether the item is a frozen food (e.g., ice cream, frozen vegetables, ice) or hot food (e.g., pizza, carry-out food, prepared dinners from a grocery store). The controller circuit 12 can reduce the first threshold 26 to a shorter time to remind the driver that the hot or cold food remains in the vehicle 20 so that the food does not spoil or melt if forgotten by the driver. However, the hot or cold items need not be food-related. For example, the cold items can be medicines or biological items that may be perishable if the package is stored in a hot or cold vehicle for an extended period of time. The controller circuit 12 can also reduce the second and third thresholds based on the temperature of the objects 18 and can elect not to output the notifications 30 to the EMS 38 when the controller circuit 12 determines that objects 18 are not persons or animals.

Figure 7:
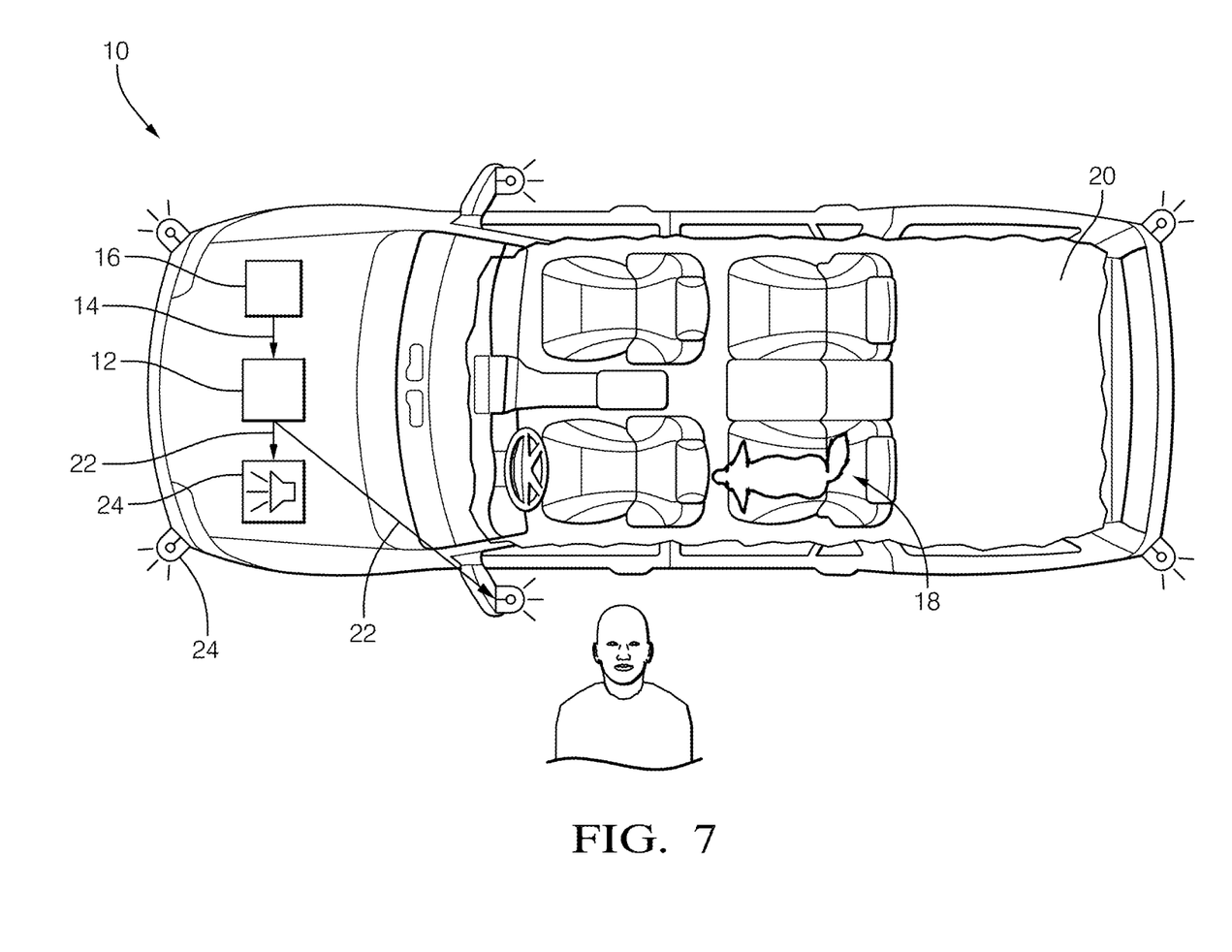
FIG. 7 illustrates another example of the vehicle-occupant alert system of FIG. 1 installed on a vehicle where the driver has exited the vehicle leaving a pet in the vehicle.

The first threshold 26 can be based on a life form of the objects 18 remaining inside the vehicle. FIG. 7 illustrates another example of the system 10 installed on the vehicle 20 where the driver has exited, and an animal (e.g., a dog) remains on the rear seat. The controller circuit 12 can determine whether the object 18 is a person or an animal and can determine an animal species (e.g., dogs, birds, turtles, snakes) based on the occupant data 14 received from the OCS 17. When the controller circuit 12 determines that the life form is the animal other than the person, the controller circuit 12 can adjust the first threshold is based on the species of the animal remaining inside the vehicle 20. For example, when the animal is the dog, the controller circuit 12 can reduce the first threshold 26, and when the animal is a species that may not be susceptible to heat- or cold-related injuries, the controller circuit 12 can increase the first threshold 26.

When the controller circuit 12 determines that the life form is the person, the controller circuit 12 can adjust the first threshold 26 based on an age or age category of the person. For example, the controller circuit 12 can determine the age category of the person (i.e., whether the person is a child or an elderly or geriatric person) based on the classification performed by the software in the OCS 17. The classification models can determine features of the person that are characteristic of a child or elderly person, for example, a size of the person and facial features that correspond to trained models of elderly facial features and youthful facial features. The trained models need not determine a specific age of the occupant, only the age category of child or elderly person. The age thresholds for the age categories can be adjusted by the training data according to the user preferences. The controller circuit 12 can reduce the first threshold 26 when the person is determined to be the child or elderly person, as these segments of the population are most vulnerable to heat- and cold-related injuries or death.

Example Method

Figure 8:
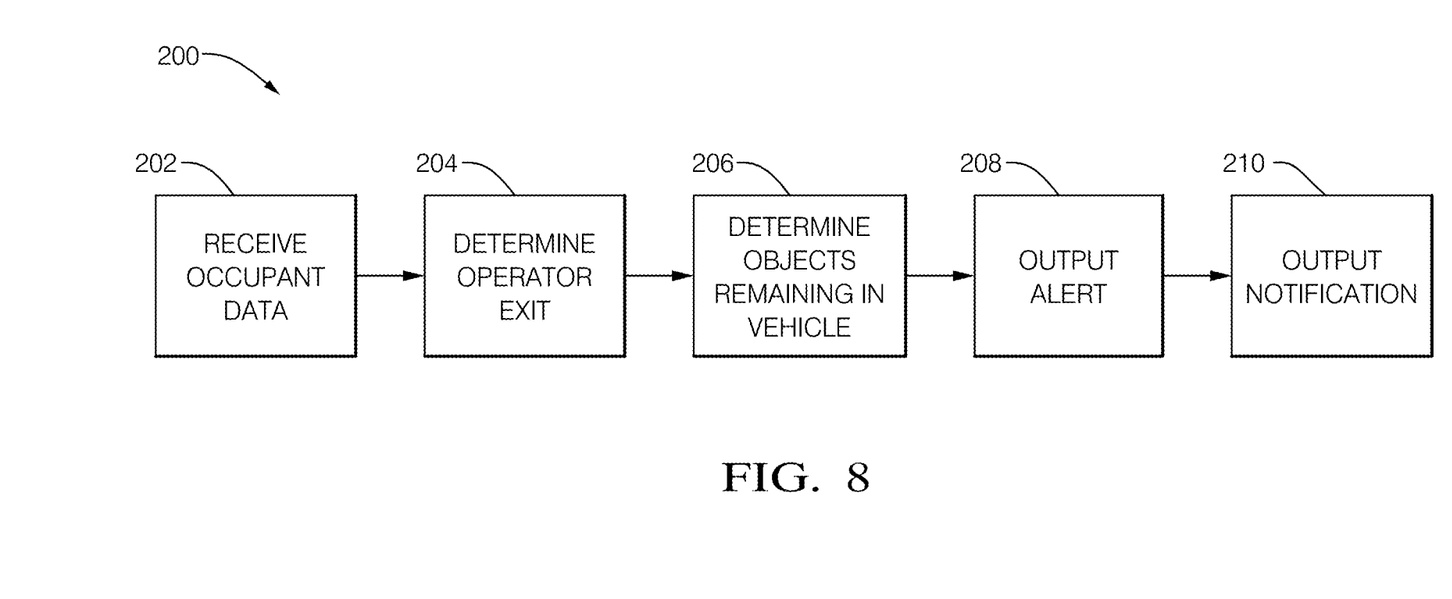
FIG. 8 is an example method of operating the example vehicle-occupant alert system of FIG. 1.

FIG. 8 illustrates example methods 200 performed by the system 10. For example, the controller circuit 12 configures the system 10 to perform operations 202 through 210 by executing instructions associated with the controller circuit 12. The operations (or steps) 202 through 210 are performed but not necessarily limited to the order or combinations in which the operations are shown herein. Further, any of one or more of the operations may be repeated, combined, or reorganized to provide other operations.

Step 202 includes RECEIVE OCCUPANT DATA. This can include receiving, with the controller circuit 12, the occupant data 14 from the occupancy-monitoring sensor 16 that detects the presence of objects 18 inside the vehicle 20. The occupancy-monitoring sensor 16 can be a component of the OCS 17, as described above. The objects 18 can include people, animals, and packages that are detected by different devices that comprise the occupancy-monitoring sensor 16, including 2D and 3D cameras, thermal cameras, seat-pressure sensors, seat-belt-latch sensors, and radar sensors, as described above. The OCS 17 processes the data from the cameras, radar sensors, or the seat-pressure sensors to determine whether the seats are empty or occupied. The occupancy status indicates several occupancy-status parameters that specify whether the seat is occupied or vacant, and whether the seat is occupied by the adult, the child, the pet, or the package, as described above. The occupant data 14 from the OCS 17 is periodically updated and transmitted to the controller circuit 12 via transmission links to account for changes in the seat occupancy.

Step 204 includes DETERMINE OPERATOR EXIT. This can include determining, with the controller circuit 12, whether the driver has exited the vehicle 20 based on the occupant data 14, as described above. The controller circuit 12 determines that the driver's seat is unoccupied based on the in-cabin cameras and the seat-pressure sensor located in the driver's seat. The controller circuit 12 can also determine that the driver's door has cycled open and closed and that the door locks have been actuated based on signals received via the CAN bus, as described above. The door or lock cycling events can be used by the controller circuit 12 to trigger the timer to determine the time elapsed after the driver exits the vehicle 20, as described above.

Step 206 includes DETERMINE OBJECTS REMAINING IN VEHICLE. This can include determining, with the controller circuit 12, whether the child, animal, or other objects 18 remain in the vehicle 20 after the driver has exited, as described above. The OCS 17 can determine whether an adult or the child is occupying the seat based on a pressure threshold indicative of a weight of the occupant, and by the distribution of the pressure that can indicate whether a child safety seat is installed. The controller circuit 12 can determine whether the person is the child or the elderly person based on the classification performed by the software in the OCS 17, as described above. Software in the OCS 17 can distinguish persons from animals and objects 18 using known image-analysis techniques. The controller circuit 12 can determine whether the object 18 is hot or cold based on the data from the thermal camera.

Step 208 includes OUTPUT ALERT. This can include alerting, with the controller circuit 12, the driver that the child or other object 18 remains inside the vehicle 20 after the driver has exited. The alert 22 can be audible or visual to the driver outside of the vehicle 20, as described above. The controller circuit 12 starts the timer when the driver exits the vehicle 20 and determines when the child remains inside for the time exceeding the first threshold 26. When the driver waits longer than the first threshold 26 to open the door for the child, the controller circuit 12 outputs the alert 22 to the alert device 24, alerting the driver that the child remains inside the vehicle 20. The alert 22 includes repeatedly sounding the vehicle horn or repeatedly flashing the exterior lights of the vehicle 20 at regular intervals, as described above. The controller circuit 12 can increase the intensity of the output of the alert 22 when the time exceeds the second threshold 28 by sounding the horn and flashing the vehicle's 20 exterior lights at shorter intervals to draw the driver's attention back to the vehicle 20, as described above.

Step 210 includes OUTPUT NOTIFICATION. This can include notifying, with the controller circuit 12, the driver and another person different from the driver that the child remains in the vehicle 20 when the time exceeds the second threshold 28, as described above. The notification 30 can be output to the registered receiver devices via email, text message, and voice notification. The notification 30 can include the prepared message instructing the driver to return to the vehicle 20, or can provide additional details, for example, stating that the child (or other objects 18) remain in the unattended vehicle 20. The controller circuit 12 can increase the frequency of subsequent outputs of the notification 30 when the time exceeds the third threshold 36 and can output the notification 30 to the EMS 38 when the driver or other person fails to respond to the notifications 30, as described above.

EXAMPLES

In the following section, examples are provided.

Example 1. A system, comprising: a controller circuit configured to: receive occupant data from an occupancy-monitoring sensor configured to detect a presence of one or more objects 18 inside a vehicle; determine whether an operator of the vehicle has exited the vehicle based on the occupant data; determine based on the occupant data that the one or more objects 18 remain inside the vehicle for a time exceeding a first threshold after the operator has exited; and output an alert indicating the one or more objects remain inside the vehicle when the time exceeds the first threshold.

Example 2. The system of the previous example, wherein the alert is audible or visible from outside the vehicle.

Example 3. The system of any of the previous examples, wherein the controller circuit is further configured to determine an ambient temperature external to the vehicle and the first threshold is based on the ambient temperature.

Example 4. The system of any of the previous examples, wherein the occupancy-monitoring sensor comprises a thermal camera and the first threshold is based on a temperature of the one or more objects remaining inside the vehicle detected by the thermal camera.

Example 5. The system of any of the previous examples, wherein the controller circuit is further configured to determine a life form of the one or more objects and the first threshold is based on the life form of the one or more objects remaining inside the vehicle.

Example 6. The system of any of the previous examples, wherein the life form includes a person and the first threshold is based on an age of one or more people remaining inside the vehicle.

Example 7. The system of any of the previous examples, wherein the life form includes an animal other than a person, and the first threshold is based on a species of one or more animals remaining inside the vehicle.

Example 8. The system of any of the previous examples, wherein the occupancy-monitoring sensor comprises one or more of a camera, a seat-pressure sensor, a seat-belt-latch sensor, and a radar sensor.

Example 9. The system of any of the previous examples, wherein the controller circuit is further configured to increase an intensity of the output of the alert when the time exceeds a second threshold.

Example 10. The system of any of the previous examples, wherein the controller circuit is further configured to output a notification that the one or more objects remain inside the vehicle, the notification being output to a registered receiver device via one or more of an email, text message, and voice notification.

Example 11. The system of any of the previous examples, wherein the registered receiver device includes one or more of a first device associated with the operator and a second device different from the first device that is associated with at least one user other than the operator.

Example 12. The system of any of the previous examples, wherein the controller circuit is further configured to output the notification when the time exceeds a second threshold.

Example 13. The system of any of the previous examples, wherein the controller circuit is further configured to increase a frequency of subsequent outputs of the notification when the time exceeds a third threshold.

Example 14. The system of any of the previous examples, wherein the controller circuit is further configured to output the notification to an emergency medical services (EMS) when the subsequent outputs of the notifications are unanswered.

Example 15. A method, comprising: receiving, with a controller circuit, occupant data from an occupancy-monitoring sensor configured to detect a presence of one or more objects inside a vehicle; determining, with the controller circuit, whether an operator of the vehicle has exited the vehicle based on the occupant data; determining based on the occupant data, with the controller circuit, that the one or more objects remain inside the vehicle for a time exceeding a first threshold after the operator has exited; and outputting an alert, with the controller circuit, indicating the one or more objects remain inside the vehicle when the time exceeds the first threshold.

Example 16. The method of the previous example, including outputting the alert that is audible or visible from outside the vehicle.

Example 17. The method of any of the previous examples, including increasing an intensity of the output of the alert, with the controller circuit, when the time exceeds a second threshold.

Example 18. The method of any of the previous examples, including outputting a notification when the time exceeds a second threshold, with the controller circuit, that the one or more objects remain inside the vehicle, the notification being output to a registered receiver device via one or more of an email, text message, and voice notification.

Example 19. The method of any of the previous examples, wherein the registered receiver device includes one or more of a first device associated with the operator and a second device different from the first device that is associated with at least one user other than the operator.

Example 20. The method of any of the previous examples, including increasing a frequency of subsequent outputs of the notification, with the controller circuit, when the time exceeds a third threshold, and outputting the notification to an emergency medical services (EMS) when the subsequent outputs of the notifications are unanswered.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system, comprising:
    a controller circuit configured to:
      receive occupant data, including radar data, from an occupancy-monitoring sensor configured to detect a presence of one or more objects inside a vehicle;
      determine whether an operator of the vehicle has exited the vehicle based on the occupant data;
      responsive to detecting a presence of one or more objects inside the vehicle, determine, based at least in part on the radar data, if the one or more objects comprise a life form;
      responsive to determining if the one or more objects comprise a life form:
        determine, from the radar data, a classification of the life form;
        further determine, based on the occupant data, that the one or more objects remain inside the vehicle for a time exceeding a first threshold since the operator has exited the vehicle, the first threshold determined based in part on the classification determined from the radar data; and
        output an alert indicating that the one or more objects remain inside the vehicle when the time exceeds the first threshold.

2. The system of claim 1, wherein the alert is audible or visible from outside the vehicle.

3. The system of claim 1, wherein the controller circuit is further configured to determine an ambient temperature external to the vehicle and the first threshold is based on the ambient temperature.

4. The system of claim 1, wherein the occupancy-monitoring sensor comprises a thermal camera and the first threshold is based on a temperature of the one or more objects remaining inside the vehicle detected by the thermal camera.

5. The system of claim 1, wherein the life form includes a person and the first threshold is based on an age of one or more people remaining inside the vehicle.

6. The system of claim 1, wherein the life form includes an animal other than a person, and the first threshold is based on a species of one or more animals remaining inside the vehicle.

7. The system of claim 1, wherein the occupancy-monitoring sensor comprises one or more of a camera, a seat-pressure sensor, a seat-belt-latch sensor, and a radar sensor.

8. The system of claim 1, wherein the controller circuit is further configured to increase an intensity of the output of the alert when the time exceeds a second threshold.

9. The system of claim 1, wherein the controller circuit is further configured to output a notification that the one or more objects remain inside the vehicle, the notification being output to a registered receiver device via one or more of an email, text message, and voice notification.

10. The system of claim 9, wherein the registered receiver device includes one or more of a first device associated with the operator and a second device different from the first device that is associated with at least one user other than the operator.

11. The system of claim 9, wherein the controller circuit is further configured to output the notification when the time exceeds a second threshold.

12. The system of claim 11, wherein the controller circuit is further configured to increase a frequency of subsequent outputs of the notification when the time exceeds a third threshold.

13. The system of claim 12, wherein the controller circuit is further configured to output the notification to an emergency medical services (EMS) when the subsequent outputs of the notifications are unanswered.

14. The system of claim 1, wherein the controller circuit is further configured to determine a classification of the life form by:
    inputting, to a trained machine learning model, the radar data alone or in combination with non-radar sensor data to determine an age class or a species class of the life form.

15. A method, comprising:
    receiving, with a controller circuit, occupant data from an occupancy-monitoring sensor configured to detect a presence of one or more objects inside a vehicle;
    determining, with the controller circuit, whether an operator of the vehicle has exited the vehicle based on the occupant data;
    responsive to detecting a presence of one or more objects inside the vehicle, determining whether the one or more objects comprise a life form based in part on radar data within the occupant data;

responsive to determining that the one or more objects comprise a life form:
utilizing a trained model to determine a classification of the life form indicative of at least one of an age class or a species class;
determining, based in part on the radar data and with the controller circuit, that the one or more objects remain inside the vehicle for a time exceeding a first threshold since the operator has exited the vehicle, the first threshold determined based on the classification of the life form; and
outputting, with the controller circuit, an alert indicating that the one or more objects remain inside the vehicle when the time exceeds the first threshold.

16. The method of claim 15, including outputting the alert that is audible or visible from outside the vehicle.

17. The method of claim 15, including increasing an intensity of the output of the alert, with the controller circuit, when the time exceeds a second threshold.

18. The method of claim 15, including outputting a notification when the time exceeds a second threshold, with the controller circuit, that the one or more objects remain inside the vehicle, the notification being output to a registered receiver device via one or more of an email, text message, and voice notification.

19. The method of claim 18, wherein the registered receiver device includes one or more of a first device associated with the operator and a second device different from the first device that is associated with at least one user other than the operator.

20. The method of claim 18, including increasing a frequency of subsequent outputs of the notification, with the controller circuit, when the time exceeds a third threshold, and outputting the notification to an emergency medical services (EMS) when the subsequent outputs of the notifications are unanswered.

* * * * *